United States Patent [19]
Bradley et al.

[11] Patent Number: 5,768,589
[45] Date of Patent: Jun. 16, 1998

[54] METHOD AND APPARATUS FOR EXECUTING STORED PROCEDURES IN A FOREIGN DATABASE MANAGEMENT SYSTEM

[75] Inventors: Kirk A. Bradley; Eleanor M. Hayes; Edwin W. Meijer, all of San Francisco; Bert Simonis, Foster City, all of Calif.

[73] Assignee: Oracle Corporation, Redwood Shores, Calif.

[21] Appl. No.: 680,561

[22] Filed: Jul. 12, 1996

[51] Int. Cl.⁶ .................................................. G06F 17/30
[52] U.S. Cl. .............................. 395/684; 707/3; 707/10
[58] Field of Search ............................... 395/684, 680, 395/610, 601–604, 612; 707/10, 101, 1–4

[56] References Cited

U.S. PATENT DOCUMENTS

| | | | |
|---|---|---|---|
| 4,714,995 | 12/1987 | Materna et al. | 395/617 |
| 5,257,366 | 10/1993 | Adair et al. | 395/604 |
| 5,278,978 | 1/1994 | Demers et al. | 395/617 |
| 5,416,917 | 5/1995 | Adair et al. | 395/500 |
| 5,544,355 | 8/1996 | Chaudhuri et al. | 395/602 |
| 5,564,113 | 10/1996 | Bergen et al. | 395/604 |
| 5,566,332 | 10/1996 | Adair et al. | 395/612 |
| 5,590,319 | 12/1996 | Cohen et al. | 395/604 |
| 5,596,744 | 1/1997 | Dao et al. | 395/610 |
| 5,634,053 | 5/1997 | Noble et al. | 395/604 |
| 5,649,168 | 7/1997 | Huang et al. | 395/500 |

*Primary Examiner*—Paul V. Kulik
*Attorney, Agent, or Firm*—Blakely, Sokoloff Taylor & Zafman

[57] ABSTRACT

A method and apparatus for transparently invoking from a first database management system (DBMS) a stored procedure residing at a second DBMS. The first DBMS initially receives an instruction from a user to execute the stored procedure. In response, an invoking instruction executable at the second DBMS is automatically generated for causing the second DBMS to execute the stored procedure. The invoking instruction is sent to the second DBMS. In response to the invoking instruction, the second DBMS executes the stored procedure and provides the results to the first DBMS, which provides the results to the user. The fact that the stored procedure resides at the second, rather than the first, DBMS is transparent to the user.

21 Claims, 5 Drawing Sheets

METHOD AND APPARATUS FOR EXECUTING STORED PROCEDURES IN A FOREIGN DATABASE MANAGEMENT SYSTEM

BACKGROUND OF THE INVENTION

1. Field of the Invention

The present invention relates to database management systems and, in particular, enabling a first database management system (DBMS) to invoke the execution of stored procedures residing at a foreign DBMS.

2. Description of Related Art

For both intra-organization and inter-organization information access, it is often necessary for one DBMS to access information from a different or foreign DBMS. A foreign DBMS is typically considered to be a DBMS from a different vendor. For example, a Sybase designed DBMS is considered a foreign DBMS when compared to an Oracle designed DBMS.

Typically, access from one DBMS into a foreign DBMS is achieved by executing a series of query statements. The following steps are performed for each statement. Initially, a statement is generated at a first DBMS. The statement is converted into a form understood by the foreign DBMS and is sent to the foreign DBMS. In response, the foreign DBMS executes the statement and returns a result to the first DBMS. The result is received by the first DBMS and is converted into a format that the first DBMS can understand.

Accessing a foreign DBMS in this manner, however, increases the network traffic and the processing time by the number of query statements interchanged.

The drawbacks of executing a series of query statements could be overcome by enabling a first DBMS to invoke a stored procedure at a foreign DBMS. A stored procedure is generally equivalent to a series of preprocessed query statements which are ready to be executed by the foreign DBMS. Invoking a stored procedure at a foreign DBMS from a first DBMS, generates less network traffic because only one call is needed to invoke a stored procedure.

In addition, execution of stored procedures residing at a foreign DBMS is typically faster than exchanging a series of query statements because the stored procedures are already in executable form. Therefore, the stored procedures do not have to be prepared for execution, as do query statements generated at the first DBMS.

However, no mechanism currently exists for enabling a first DBMS to invoke stored procedures at a foreign DBMS.

SUMMARY OF THE INVENTION

The present invention provides a method and apparatus for transparently invoking from a first database management system (DBMS) a stored procedure residing at a second DBMS. The first DBMS initially receives an instruction from a user to execute the stored procedure. In response, an invoking instruction is automatically generated for causing the second DBMS to execute the stored procedure. The invoking instruction is then sent to the second DBMS. In response to the invoking instruction, the second DBMS executes the stored procedure and provides the results to the first DBMS, which in turn, provides the results to the user. Because the invoking instruction is automatically generated and sent to the second DBMS without user intervention, the fact that the stored procedure resides at the second DBMS is transparent to the user.

BRIEF DESCRIPTION OF THE DRAWINGS

The present invention is illustrated by way of example, and not by way of limitation, in the figures of the accompanying drawings, and in which like reference numerals refer to similar elements, and in which.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

COMPUTER SYSTEM OVERVIEW

Figure 1A:
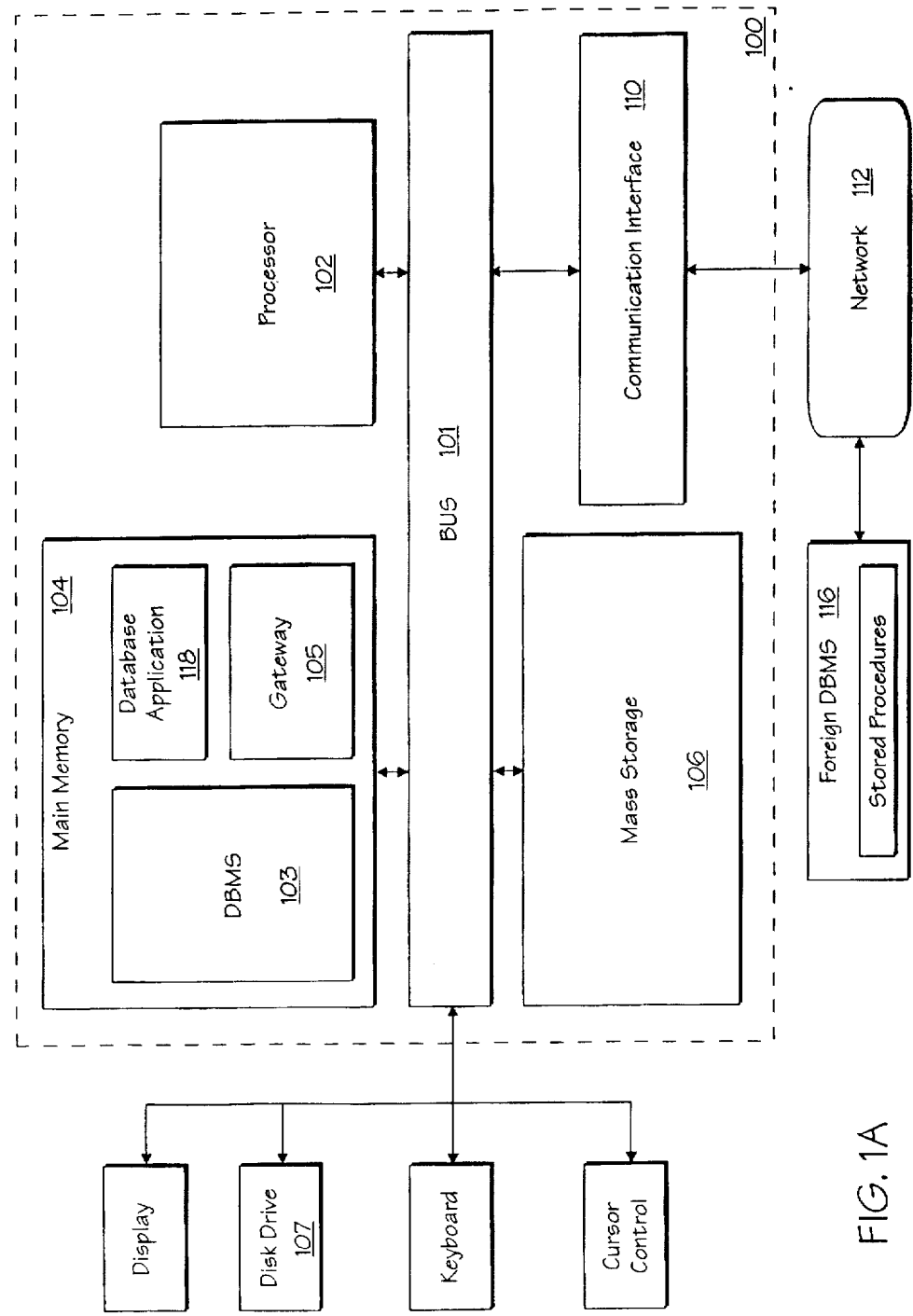
FIG. 1A is a block level diagram of a computer system capable of invoking execution of a stored procedure residing at a foreign DBMS according to one embodiment of the present invention.

FIG. 1A illustrates a block level diagram of a computer system 100 capable of invoking execution of a stored procedure residing at a foreign DBMS according to one embodiment of the present invention. The computer system 100 includes a bus 101 for communicating information, and a processor 102. The computer system 100 further includes a random access memory (RAM) or other dynamic storage device 104 (referred to as main memory) for storing information and instructions to be executed by the processor 102. The main memory 104 may also be used for storing temporary variables or other intermediate information during execution of instructions by the processor 102.

Main memory is shown in FIG. 1A storing a first DBMS 103, which includes a set of instructions that are used to store and retrieve data stored in indexed tables typically stored in a separate mass storage device 106. A user is able to retrieve and update information stored in the mass storage device 106 by entering input that is converted to query statements by a database application 118. The database application 118 submits the statements to the first DBMS 103. In response, the first DBMS 103 executes the statements and accesses the tables specified in the statements to determine which information within the tables satisfies the statements. The information that satisfies the statements is then retrieved by the first DBMS 103 and transmitted to the database application and presented to the user.

The main memory is also shown storing a gateway 105, which establishes functional compatibility between the first DBMS 103 and the foreign DBMS 116. The first DBMS 103 is able to communicate through the gateway with the foreign DBMS 116 by using the communication interface 110 to gain access onto a network 112 which is connected to the foreign DBMS 116.

In alternative embodiments, the gateway 105 and the first DBMS 103 can run on separate computer systems.

Moreover, the gateway 105, as well as the first DBMS and the database application, can be stored on any computer-readable medium, including magnetic and optical disks, or other random access and dynamic memory devices.

A disk drive device 107 can also be coupled to computer system 100 to provide access to data and instructions stored on magnetic disk or optical disk.

Figure 1B:
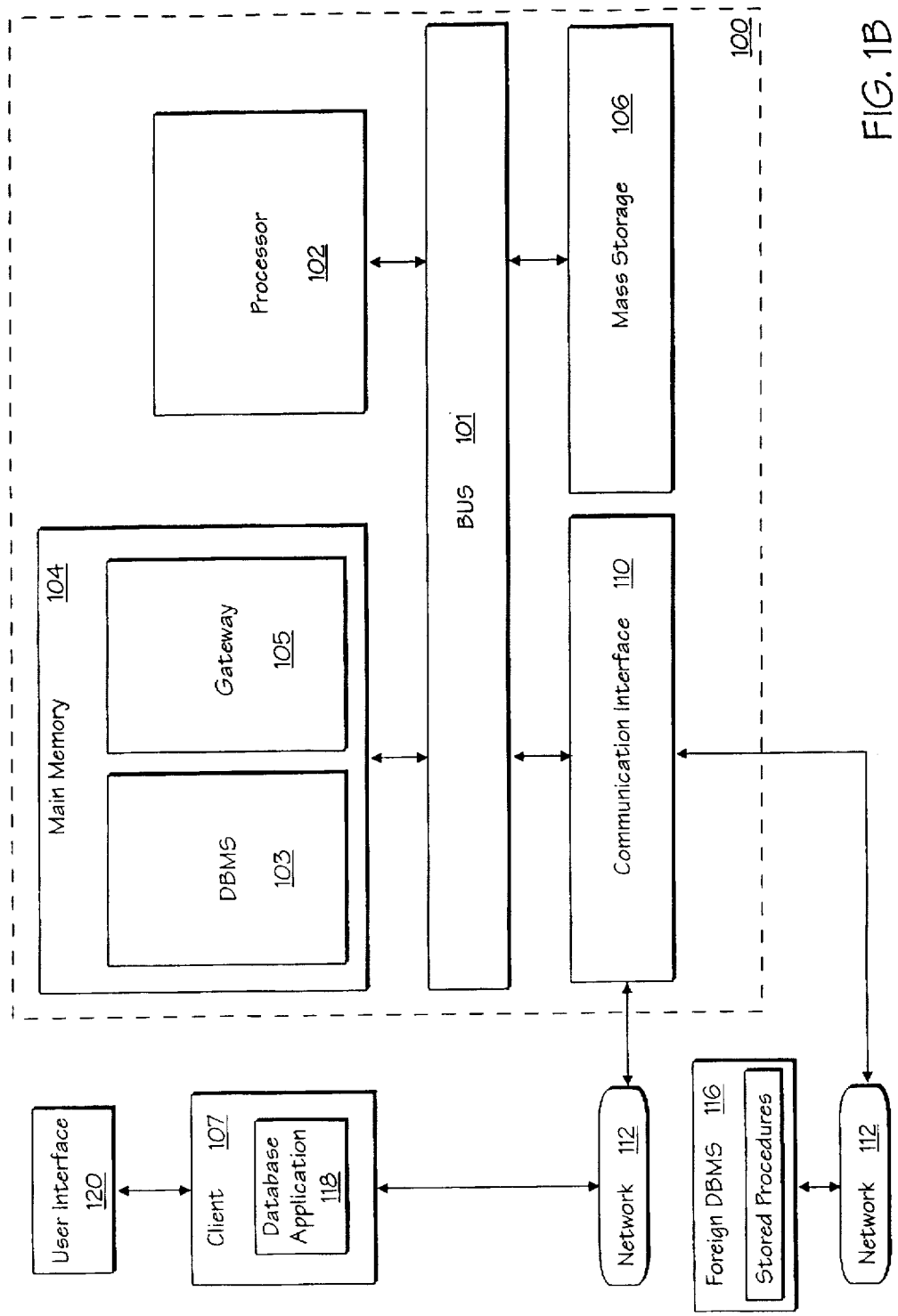
FIG. 1B illustrates a client-server environment capable of invoking execution of a stored procedure residing at a foreign DBMS according to one embodiment of the present invention.

FIG. 1B illustrates an alternative embodiment implementing the present invention in a client-server environment, wherein input is entered through a user interface 120 into a client workstation 107. The database application of the client workstation 107 converts the input into query statements and presents the statements to the DBMS 103 of the computer system 100, which acts as a server to the client workstation 107. In response, the DBMS 103 processes the statements, including using the gateway 105 to invoke the execution of stored procedures residing in the foreign DBMS 116.

EXECUTION OF STORED PROCEDURES AT A FOREIGN DBMS

Figure 2:
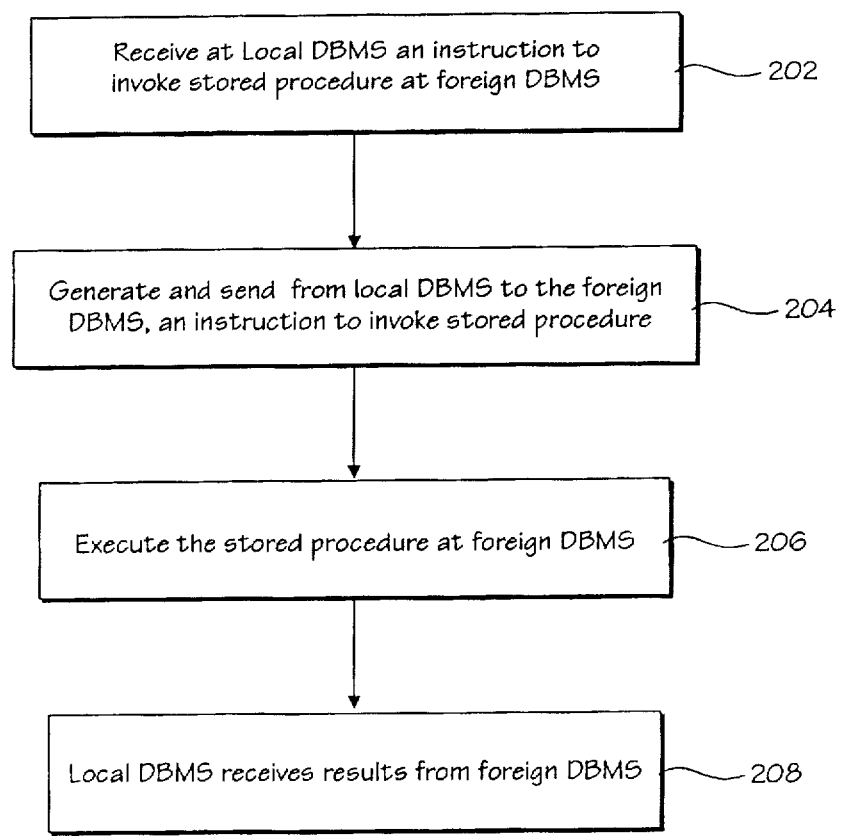
FIG. 2 is a high level flow diagram summarizing the steps of a first DBMS invoking a stored procedure residing at a foreign DBMS according to one embodiment of the present invention.

FIG. 2 is a high level flow diagram summarizing the steps of a first DBMS invoking execution of a stored procedure residing at a foreign DBMS 116, according to one embodiment of the present invention. In step 202, the computer system 100 receives an instruction generated by a user to execute a stored procedure, which is residing in a foreign DBMS 116. In step 204, the computer system 100 generates an instruction to invoke execution of the stored procedure residing at the foreign DBMS 116 and sends the instruction to the foreign DBMS 116. In response, in step 206, the stored procedure residing at the foreign DBMS is executed by the foreign DBMS. In step 208, the computer system 100 receives the results generated by executing the stored procedure at the foreign DBMS. These results include the execution status of the stored procedure and, optionally, data. Whether data is returned depends upon the nature of the instruction generated by the user.

Figure 3A:
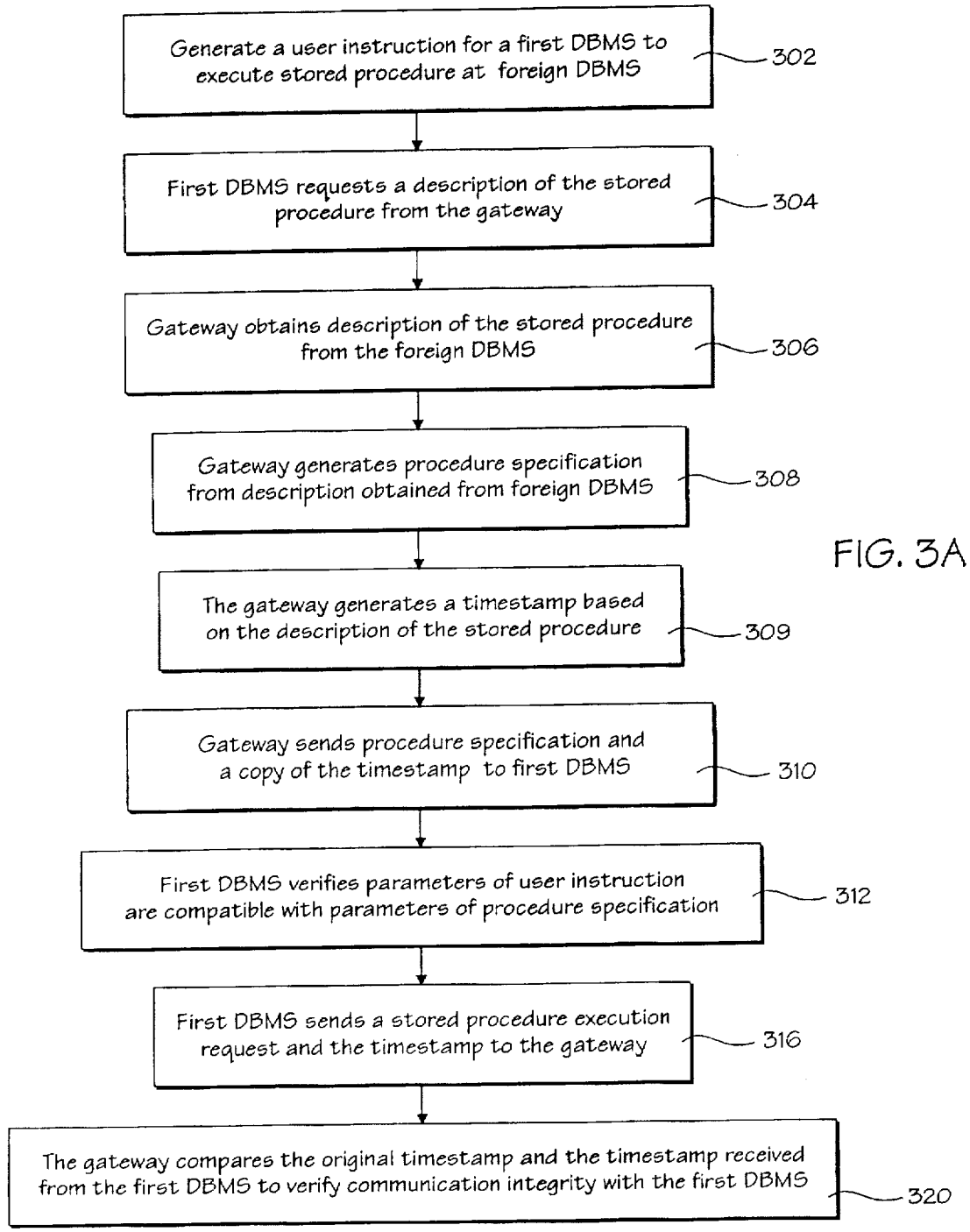
FIGS. 3A and 3B are a single flow diagram illustrating the implementing steps to have a first DBMS invoke a stored procedure residing at a foreign DBMS according to one embodiment of the present invention.
Figure 3B:
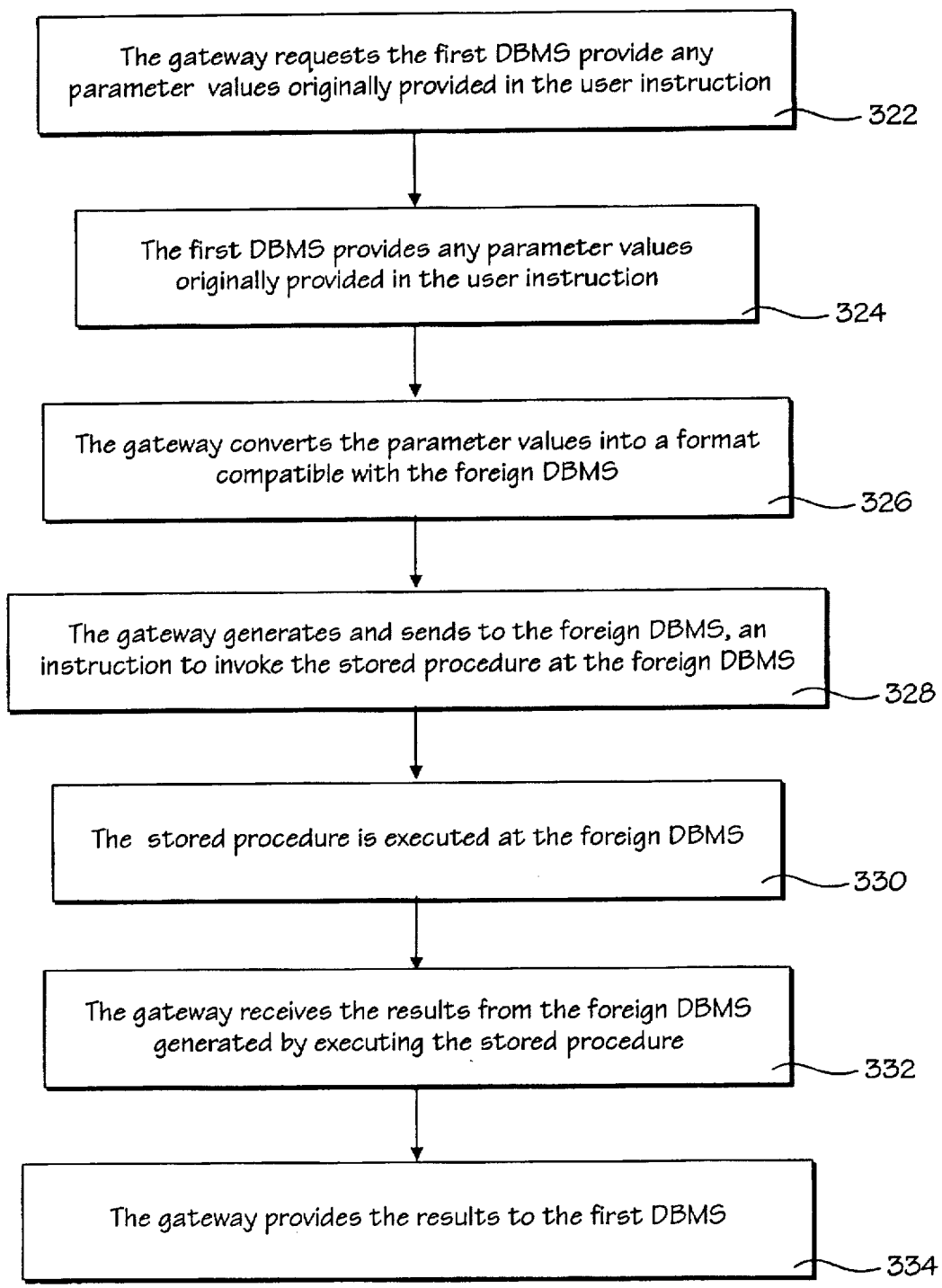

FIG. 3 is a more detailed flow diagram illustrating the steps implemented to enable a first DBMS to invoke a stored procedure residing in a foreign DBMS, according to one embodiment of the present invention. In step 302, while running a database application, a user generates an instruction requesting the execution of a stored procedure. The application forwards the instruction to the first DBMS 103. In one embodiment, the instruction generated by the user includes the name of the stored procedure and any input values, if applicable. The instruction to execute the stored procedure may be generated by either a human user or automatically generated by a computer system.

The first DBMS is either explicitly informed by the instruction that the stored procedure is in a foreign DBMS, and thus, the gateway should be invoked. Otherwise, the stored procedure is, transparent to the user, identified as being stored in a separate DBMS by way of a pre-defined synonym stored in the first DBMS. The pre-defined synonym indicates to the first DBMS that the gateway is to be accessed in order to invoke execution of the stored procedure.

Table 1, shown below, demonstrates a pseudo code example of a user-generated request to execute a stored procedure, which resides at a foreign DBMS. As shown, the pseudo code performs the steps of: declaring variables for input and output parameters; initializing the input variable; and, invoking execution of the stored procedure.

TABLE 1

Declare
    inputvar number;
    outputvar number;
begin
    inputvar = 10;
    Procedure (inputvar, outputvar);
end;

In step 304, the first DBMS responds to the user instruction by issuing a request to the gateway to obtain a description of the stored procedure. This request includes the name of the stored procedure and other information, such as schema names, which uniquely identifies the stored procedure.

In step 306, the gateway issues a request to the foreign DBMS, where the stored procedure resides, to have the foreign DBMS provide a description of the stored procedure. In response, the foreign DBMS provides to the gateway a description of the stored procedure residing at the foreign DBMS. In one embodiment, the description information received by the gateway is stored into a C structure. In alternative embodiments, comparable data structures may be used to store the description information. If the foreign DBMS is unable to provide the description, an error message is generated.

In one embodiment, the description of the stored procedure obtained from the foreign DBMS includes: (1) the procedure name; (2) type (i.e., procedure or user function); and (3) an optional parameter list. If parameters are provided in the description, they may include associated parameter information such as: a Parameter Name (if not present, the gateway 105 will generate a unique name); a Parameter Datatype (base, cursor, record, or table datatype); a Parameter Type (input, output, or input/output); a Parameter Precision; a Parameter Scale; or nullable information (True or False). For parameters which are record or cursor datatypes, a separate field exists which indicates the record or cursor name. Each element of the record or cursor result-set is then treated like a separate parameter, meaning that the information provided for a base datatype parameter, is also typically provided for every record or cursor result-set element.

In step 308, the gateway uses the description information to generate a procedure specification which, in effect, is a transformation of the description information into a form that the first DBMS 103 can understand. In step 309, the gateway generates a timestamp by generating a hash value based upon elements of the stored procedure description, such as the procedure name and the associated parameter information. In step 310, the gateway sends the procedure specification and a copy of the timestamp to the first DBMS 103.

Upon receipt of the procedure specification, in step 312, the first DBMS 103 verifies that the parameters of the procedure specification are compatible with any parameters provided in the original user-generated instruction requesting execution of the stored procedure. In effect, in step 312, the first DBMS 103 is verifying that the user has provided the proper information needed to invoke the foreign stored procedure. If the parameters are not compatible, an error message is generated.

Provided the parameters are compatible, in step 316, the first DBMS 103 generates a stored procedure execution request and sends the request along with the timestamp and other associated information to the gateway to have the gateway invoke execution of the stored procedure at the foreign DBMS. In step 318, the gateway receives the execution request, the timestamp, and the associated information. In step 320, the gateway compares the timestamp received from the first DBMS with the original timestamp generated by the gateway, in order to verify the integrity of the communication between the first DBMS and the gateway. If the timestamps are inconsistent, an error message is generated.

After verifying the timestamp, in step 322, the gateway issues a request to the first DBMS to provide the gateway with any parameter values that were originally passed by the user. In response, in step 324, the first DBMS passes to the gateway any parameter values originally provided by the user.

Upon receipt of the parameter values, in step 326, the gateway, if necessary, converts the parameter values into a format compatible with the foreign DBMS. For example, a date presented as 4/22/96 may be converted to 22 Apr. 1996. In step 328, the gateway generates and sends to the foreign DBMS an instruction to invoke execution of the stored procedure at the foreign DBMS. The purpose of step 328 is to generate an instruction the foreign DBMS can understand and process. That is, step 328 creates an instruction having the format required by the foreign DBMS. The specific instruction that is actually generated will depend greatly upon the type of the foreign DBMS. Generally, though, the invoking instruction may include the name of the stored procedure, the parameter names, parameter values, and other information included in the description of the procedure.

In step 330, the foreign DBMS executes the stored procedure. In step 332, the gateway receives the results generated by executing the stored procedure at the foreign DBMS. The results include an execution status (i.e. success/failure), and perhaps data, if data is being retrieved from the foreign DBMS. If necessary, the gateway converts the results returned by the foreign DBMS into a format compatible with the first DBMS. In step 334, the results are then provided to the first DBMS, which in turn provides the results to the database application.

From the above description, it will be apparent that the invention disclosed herein provides a novel and advantageous method and apparatus for invoking from a first DBMS the execution of a stored procedure at a foreign DBMS. As will be understood by those familiar with the art, the invention may be embodied in other specific forms without departing from its essential features and, thus, the described embodiments are not restrictive of the scope of the invention. The following claims are indicative of the scope of the invention, and all variations which come within the meaning and range of equivalency of the claims are to be embraced within their scope.

What is claimed is:

1. A computer-implemented method for invoking from a first database management system (DBMS) a stored procedure residing at a second DBMS, said method comprising the steps of:

a) receiving, at the first DBMS, an instruction to execute the stored procedure, the stored procedure residing at the second DBMS;

b) in response to said instruction to execute the stored procedure, generating an invoking instruction for invoking execution of the store procedure;

c) sending said invoking instruction to the second DBMS;

d) receiving information from the second DBMS representing results of an execution of the stored procedure; and e) obtaining, in response to receiving the instruction to execute the stored procedure, a description of the stored procedure from the second DBMS.

2. The method of claim 1, wherein the description of the stored procedure obtained from the second DBMS includes a procedure name, a procedure type, and optionally includes procedure parameters.

3. The method of claim 2, wherein said procedure parameters are selected from a group consisting of parameter datatype, parameter precision, parameter scale, nullable information, and parameter name.

4. The method of claim 3, wherein in response to a parameter datatype including a record datatype, each element of said record datatype is treated as a separate parameter.

5. The method of claim 1, further including the following steps prior to the step of generating the invoking instruction:

f) generating a procedure specification from the description of the stored procedure obtained from the second DBMS, the procedure specification presented in a format compatible with the first DBMS; and h) verifying any parameter provided with the instruction to execute the stored procedure is compatible with a corresponding parameter of the procedure specification.

6. The method of claim 5, wherein the invoking instruction is generated from the description of the stored procedure obtained from the second DBMS.

7. The method of claim 6, wherein the invoking instruction includes a name of the stored procedure and a parameter value if data is to be processed by executing the stored procedure.

8. A computer-readable medium having stored thereon data representing a sequence of instructions for invoking from a first database management system (DBMS) a stored procedure residing at a second DBMS, said sequence of instruction which, when executed by a processor, cause said processor to perform the steps of:

a) receiving, at the first DBMS, an instruction to execute the stored procedure, the stored procedure residing at the second DBMS;

b) in response to said instruction to execute the stored procedure, generating an invoking instruction for invoking execution of the store procedure;

c) sending said invoking instruction to the second DBMS; and d) receiving information from the second DBMS representing results of an execution of the stored procedure; and e) obtaining, in response to receiving the instruction to execute the stored procedure and prior to generating the invoking instruction, a description of the stored procedure from the second DBMS.

9. The computer-readable medium of claim 8, wherein the description of the stored procedure obtained from the second DBMS includes a procedure name, a procedure type, and optionally includes procedure parameters.

10. The computer-readable medium of claim 9, wherein said procedure parameters are selected from a group consisting of parameter datatype, parameter precision, parameter scale, nullable information, and parameter name.

11. The computer-readable medium of claim 10, wherein, in response to a parameter datatype including a record datatype, each element of said record datatype is treated as a separate parameter.

12. The computer-readable medium of claim 8, further including instructions which, when executed by the processor, would cause the processor to perform the following steps prior to the step of generating the invoking instruction:

f) generating a procedure specification from the description of the stored procedure obtained from the second DBMS, the procedure specification in a format compatible with the first DBMS;

g) verifying a parameter of the instruction to execute the stored procedure is compatible with a corresponding parameter of the procedure specification.

13. The computer-readable medium of claim 12, wherein the invoking instruction is generated from the procedure specification.

14. The computer-readable medium of claim 13, wherein the invoking instruction includes a name of the stored procedure, a parameter name if a parameter value is to be generated by executing the stored procedure, and a parameter value if data is to be processed by executing the stored procedure.

15. A computer system having a first database management system (DBMS), said computer system comprising:

a processor; and a storage device having stored therein a sequence of instructions for invoking from the first DBMS a stored procedure residing at a second DBMS, said sequence of instruction which, when executed by said processor, cause said processor to perform the steps of:

a) receiving, at the first DBMS, an instruction to execute the stored procedure residing at the second DBMS;

b) in response to said instruction, generating an invoking instruction processable by the second DBMS for causing the second DBMS to execute the store procedure;

c) sending said invoking instruction to the second DBMS;

d) receiving information from the second DBMS representing results of an execution of the stored procedure; and e) obtaining, in response to receiving the instruction to execute the stored procedure and prior to generating the invoking instruction, a description of the stored procedure from the second DBMS.

16. The computer system of claim 15, wherein the description of the stored procedure obtained from the second DBMS includes a procedure name, a procedure type, and optionally includes procedure parameters.

17. The computer system of claim 16, wherein said procedure parameters are selected from a group consisting of parameter datatype, parameter precision, parameter scale, nullable information, and parameter name.

18. The computer system of claim 17, wherein, in response to a parameter datatype including a record datatype, each element of said record datatype is treated as a separate parameter.

19. The computer system of claim 15, wherein said sequence of instructions further includes instructions which, when executed by the processor, cause the processor to perform the following steps prior to the step of generating the invoking instruction:

f) generating a procedure specification from the description of the stored procedure obtained from the second DBMS, the procedure specification in a format compatible with the first DBMS; and g) verifying a parameter of the instruction to execute the stored procedure is compatible with a corresponding parameter of the procedure specification.

20. The computer system of claim 19, wherein the invoking instruction is generated from the procedure specification.

21. The computer system of claim 20, wherein the invoking instruction includes a name of the stored procedure, and a parameter value if data is to be processed by executing the stored procedure.

* * * * *